(12) United States Patent
Ke

(10) Patent No.: US 10,915,269 B2
(45) Date of Patent: Feb. 9, 2021

(54) METHOD FOR USING SET PARAMETERS TO DETERMINE PROCESSOR PRIORITY FOR ACCESSING MEMORY WITHIN SYSTEM ON CHIP HAVING MULTIPLE PROCESSORS

(71) Applicant: Silicon Motion Inc., Hsinchu County (TW)

(72) Inventor: Kuan-Yu Ke, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/027,387

(22) Filed: Jul. 5, 2018

(65) Prior Publication Data
US 2019/0250854 A1  Aug. 15, 2019

(30) Foreign Application Priority Data
Feb. 9, 2018  (TW) .............................. 107104639 A

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC . G06F 9/52; G06F 9/522; G06F 9/524; G06F 9/526; G06F 9/528; G06F 3/0604; G06F 3/0659; G06F 3/0679
See application file for complete search history.

(56) References Cited

U.S. PATENT DOCUMENTS

| 5,321,825 | A  | * | 6/1994 | Song ......................... G06F 9/52 711/163 |
| 6,247,025 | B1 | * | 6/2001 | Bacon ................. G06F 16/2343 |
| 6,263,425 | B1 | * | 7/2001 | Falik ......................... G06F 9/52 709/226 |
| 6,779,090 | B2 | * | 8/2004 | McKenney ............. G06F 9/526 707/999.008 |
| 7,698,523 | B2 | * | 4/2010 | Pong ....................... G06F 9/526 711/163 |
| 2003/0065704 | A1 | * | 4/2003 | Buch ......................... G06F 9/52 718/107 |

(Continued)

FOREIGN PATENT DOCUMENTS

| CN | 100504791 C | 6/2009 |
| CN | 102567275 B | 1/2014 |

(Continued)

*Primary Examiner* — Reginald G Bragdon
*Assistant Examiner* — Aaron D Ho
(74) *Attorney, Agent, or Firm* — Winston Hsu

(57) ABSTRACT

The present invention provides a system on chip (SoC), wherein the SoC comprises a first processor, a second processor and a memory. The memory stores a first parameter and a second parameter, wherein the first parameter is set by the first processor to indicate whether a specific region of the memory is locked or unlocked, and the second parameter is set by the first processor to indicate whether the specific region of the memory is locked or unlocked. In the operations of the SoC, before the first processor intends or prepares to access the specific region, the first processor refers to the second parameter to determine if the specific region is allowed to be accessed by the first processor.

13 Claims, 4 Drawing Sheets

(56) References Cited

U.S. PATENT DOCUMENTS

| | | | | |
|---|---|---|---|---|
| 2009/0271793 A1* | 10/2009 | Rostedt | ................... | G06F 9/526 |
| | | | | 718/103 |
| 2010/0114849 A1* | 5/2010 | Kingsbury | .......... | G06F 16/1774 |
| | | | | 707/704 |
| 2017/0039094 A1* | 2/2017 | Dice | ........................ | G06F 9/526 |
| 2018/0373573 A1* | 12/2018 | Sherlock | ................. | G06F 9/524 |

FOREIGN PATENT DOCUMENTS

| | | |
|---|---|---|
| CN | 102301343 B | 2/2014 |
| CN | 106030522 A | 10/2016 |
| TW | 201416856 A | 5/2014 |

* cited by examiner

METHOD FOR USING SET PARAMETERS TO DETERMINE PROCESSOR PRIORITY FOR ACCESSING MEMORY WITHIN SYSTEM ON CHIP HAVING MULTIPLE PROCESSORS

BACKGROUND OF THE INVENTION

1. Field of the Invention

The present invention relates to a system on chip (SoC), and more specifically to a SoC comprising a plurality of processors.

2. Description of the Prior Art

In a SoC with two Central Processing Units (CPUs), the two CPUs might access the same region/address of the memory at the same time. This can cause the CPU to read incomplete data, or the two CPUs write data at the same time and cause data loss. Therefore, how to design an effective mechanism to prevent this situation is an important issue.

SUMMARY OF THE INVENTION

Therefore, one of the objectives of the present invention is to provide a system on chip (SoC) and a method for accessing a memory in the SoC, which can use a simple parameter design and access flow to effectively prevent two processors from simultaneously accessing the memory.

According to a first aspect of the present invention, an exemplary SoC is disclosed. The SoC comprises a first processor, a second processor, and a memory. The memory stores a first parameter and a second parameter, wherein the first parameter is set by the first processor to indicate whether a specific region of the memory is locked or unlocked, and the second parameter is set by the second processor to indicate whether the specific region of the memory is locked or unlocked; wherein before the first processor intends or prepares to access the specific region, the first processor refers to the second parameter to determine whether the specific region is allowed to be accessed by the first processor; and the second processor refers to the first parameter before accessing the specific region to determine whether the specific region can be accessed.

According to a second aspect of the present invention, an exemplary method for accessing a memory within a SoC, wherein the memory stores a first parameter and a second parameter, the first parameter is set by a first processor to indicate whether a specific region of the memory is locked or unlocked, and the second parameter is set by the second processor to indicate whether the specific region of the memory is locked or unlocked. The method comprises: before the first processor intends or prepares to access the specific region, first referring to the second parameter to determine whether the specific region can be accessed; and before the second processor intends or prepares to access the specific region, first referring to the first parameter to determine whether the specific region can be accessed.

These and other objectives of the present invention will no doubt become obvious to those of ordinary skill in the art after reading the following detailed description of the preferred embodiment that is illustrated in the various figures and drawings.

Step 400: Start;
Step 401: First processor prepares to access specific region;
Step 402: Second processor prepares to access specific region;
Step 403: First processor sets first parameter to be '1';
Step 404: Second processor sets second parameter to be '1';
Step 405: First processor reads the second parameter;
Step 406: Second processor reads the first parameter;
Step 407: Second parameter is '1'. First processor gives up to access specific region;
Step 408: First parameter is '1'. Second processor gives up to access specific region;
Step 409: First processor sets first parameter to be '0';
Step 410: Second processor sets second parameter to be '0'.

DETAILED DESCRIPTION

Figure 1:
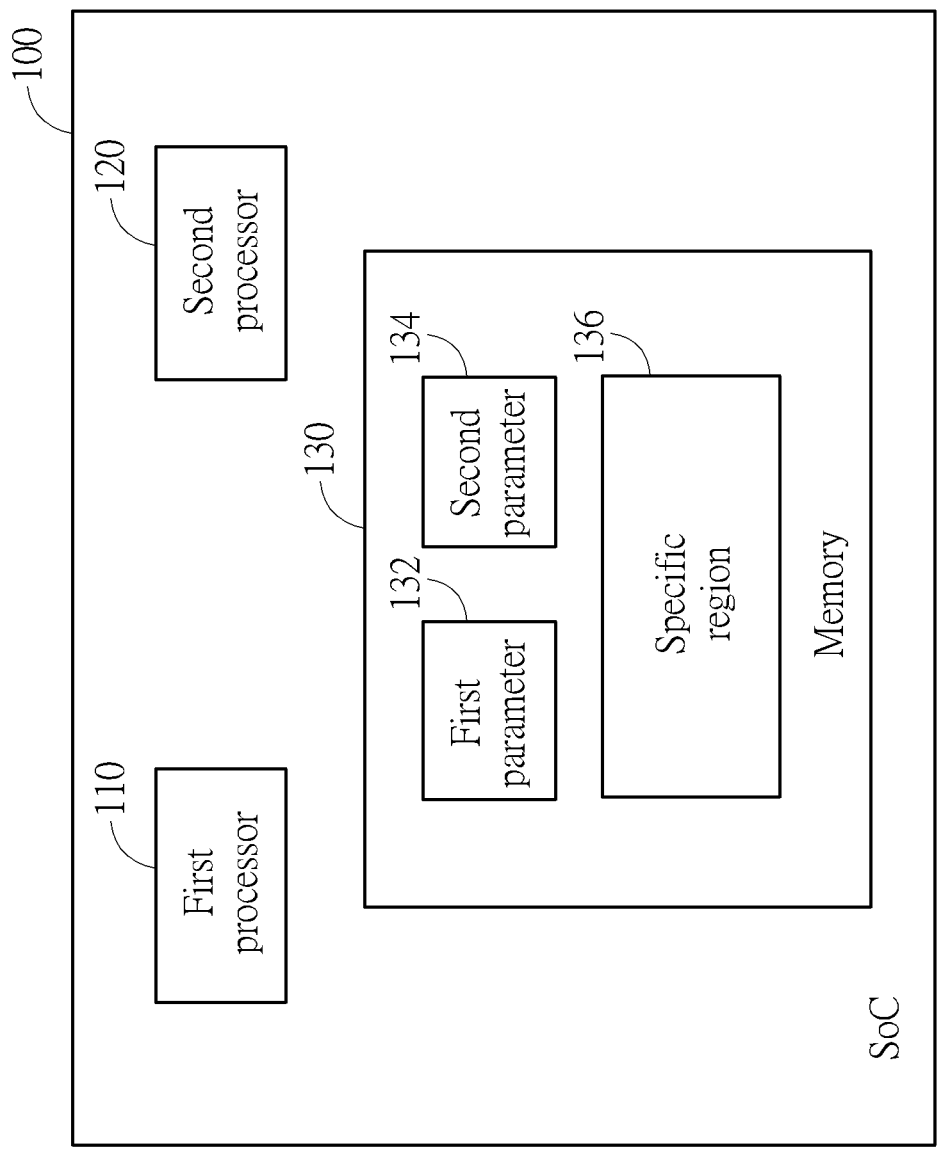
FIG. 1 is a schematic diagram of a SoC according to an embodiment of the present invention.

FIG. 1 is a schematic diagram of a SoC 100 according to an embodiment of the invention. As shown in FIG. 1, the SoC 100 comprises a first processor 110, a second processor 120, and a memory 130. The memory 130 stores a first parameter 132 and a second parameter 134. The memory 130 comprises a specific region 136 that the first processor 110 and the second processor 120 can access. In this embodiment, the first processor 110 and the second processor 120 can be a Central Processing Unit (CPU), and the memory 130 can be a Static Random-Access Memory (SRAM). However, the present invention is not limited thereto. In other embodiments, the first processor 110 and the second processor 120 can be other kinds of processors, and the memory 130 can comprise one or more different types of memory elements such as SRAM, flash memory, register, etc. In addition, although FIG. 1 only shows the memory 130 comprises the specific region 136, the memory 130 can also comprise other regions that only one of the first processor 110 and the second processor 120 can access.

In this embodiment, the specific region 136 in the memory 130 can be utilized for the communication between the first processor 110 and the second processor 120, so both the first processor 110 and the second processor 120 can access the specific region 136 for data communication/exchange. As described in the prior art, if the first processor 110 and the second processor 120 access the specific region 136 at the same time, it can cause an error in reading or writing, and thus the present invention designs the first parameter 132 and the second parameter 134 to solve the problem of the first processor 110 and the second processor 120 simultaneously accessing the specific region 136.

Specifically, the first parameter 132 is set by the first processor 110 to indicate whether the specific region 136 of the memory 130 is in a locked state or an unlocked state, wherein the locked state means that the first processor 110 prepares to access the specific region 136 or is accessing the specific region 136. The unlocked state means that the first processor 110 does not access the specific region 136 at this time. In addition, the second parameter 134 is set by the second processor 120 to indicate that whether the specific region 136 of the memory 130 is in a locked state or an unlocked state, wherein the locked state means that the second processor 120 preparing to access the specific region 136 or is accessing the specific region 136. The unlocked state means that the second processor 120 does not access the specific region 136 at this time. In this embodiment, for the convenience of the following description, the first parameter 132 and the second parameter 134 can be set to have a logic value "1" to indicate that the specific region 136 is locked and set to have a logic value "0" to indicate that the specific region 136 is unlocked, but the invention is not limited thereto. As described above, because the first parameter 132 and the second parameter 134 are utilized for indicating whether the specific region 136 is being accessed by the first processor 110 and the second processor 120, or the first processor 110 and the second processor, respectively, or the first processor 110 and the second processor 120 intend or prepare to access the specific region 136, the first processor 110 reads the second parameter 134 when preparing to access the specific region 136 to determine whether the second processor 120 prepares to access or is accessing the specific region 136. If the second parameter 134 is "1", then the first processor 110 gives up to access the specific region 136 and waits for a period of time before trying to access the specific region 136. If the second parameter is 134 is "0", then the first processor 110 can immediately access the specific region 136. Similarly, the second processor 120 first reads the first parameter 132 when preparing to access the specific region 136 to determine whether the first processor 110 prepares to access or is accessing the specific region 136. If the first parameter is 132 is "1", then the second processor 120 gives up to access the specific region 136 and waits for a period of time before trying to access the specific region 136. If the first parameter 132 is "0", then the second processor 120 can immediately access the specific region 136.

As described above, by using the first processor 110 and the second processor 120 to set the first parameter 132 and the second parameter 134, the first processor 110 and the second processor 120 can be prevented from accessing the specific region 136 at the same time. In addition, in order to maintain the correctness of the first parameter 132 and the second parameter 134, the first parameter 132 can be set only by the first processor 110 through the hardware design and cannot be modified by the second processor 120, and the second parameter 134 can also be set only by the second processor 120 through hardware design and cannot be modified by the first processor 110.

Figure 2:
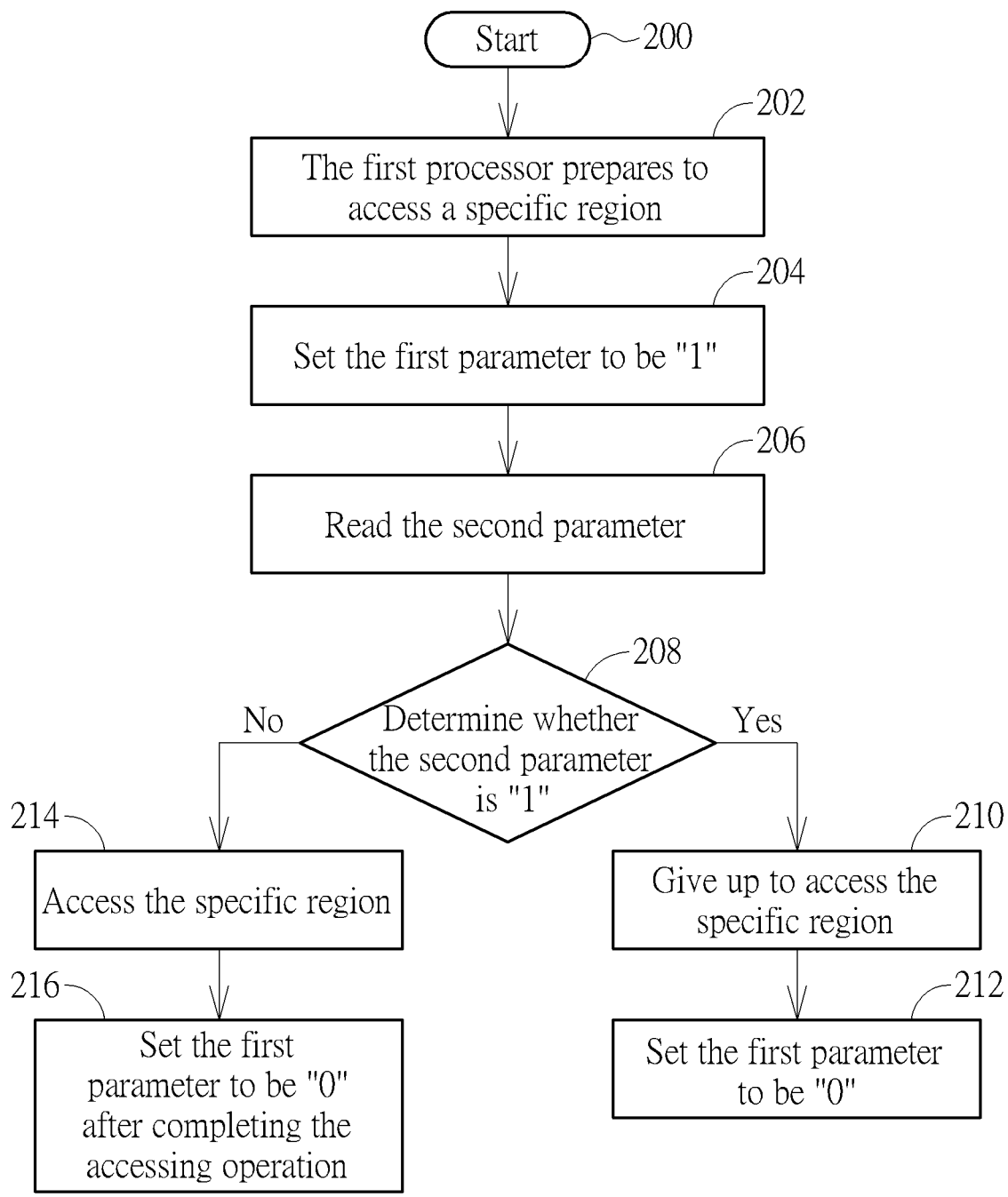
FIG. 2 is a flow chart of the first processor accessing the specific region according to an embodiment of the present invention.

FIG. 2 is a flow chart of the first processor 110 accessing the specific region 136 according to an embodiment of the present invention. In the step 200, the flow starts. In the step 202, the first processor 110 prepares to access the specific region 136. In this embodiment, the first processor 110 might need to transmit data to the second processor 120 to write the data into the specific region 136, or receive the trigger of the second processor 120 to read the data from the specific region 136. In the step 204, before accessing the specific region 136, the first processor 110 sets the first parameter 132 to be "1" to indicate that the specific region 136 is locked. Next, in the step 206, the first processor 110 reads the second parameter 134. In the step 208, the first processor 110 determines whether the second parameter 134 is "1", that is, determines whether the second parameter 134 records that the specific region 136 is locked. If yes, the flow proceeds to the step 210, otherwise the flow enters the step 214. In the step 210, since the second parameter 134 indicates that the specific region 136 is locked, that is, the second processor 110 prepares to access or is accessing the specific region 136, the first processor 110 gives up to access the specific region 136 to avoid the situation where two processors simultaneously access the specific region 136. In the step 212, since the first processor 110 gives up to access the specific region 136, the first processor 110 immediately sets the first parameter 132 to be "0" to avoid affecting the operations of other processor. In the step 214, since the second parameter 134 indicates that the specific region 136 is unlocked, that is, the second processor 120 does not prepare to access or is not accessing the specific region 136, the first processor 110 can immediately access the specific region 136. In the step 216, after the first processor 110 completes the accessing operation, the first processor 110 sets the first parameter 132 to be "0".

In the embodiment of FIG. 2, the first processor 110 is utilized as an example, and the operation of the second processor 120 is also similar to the operation of the first processor 110, and thus the related details will not be described again.

In an embodiment of the present invention, if both the first processor 110 and the second processor 120 are ready to access the specific region 136 at the same time, then the first processor 110 and the second processor 120 respectively set the first parameter 132 and the second parameter 134 to be "1" to indicate that the specific region 136 is locked. After that, the first processor 110 and the second processor 120 respectively refer to the second parameter 134 and the first parameter 132 to determine whether to access the specific region. In this situation, since the first parameter 132 and the second parameter 134 both indicate that the specific region 136 is locked, both the first processor 110 and the second processor 120 will give up to access the specific region 136 at this time, and respectively reset the first parameter 132 and the second parameter 134 to be "0".

In the embodiment shown in FIG. 2, when the first processor 110 finds that the second parameter 134 is "1" (locked), the first processor 110 will give up to access the specific region 136 and set the first parameter 132 from "1" to be "0". However, in another embodiment of the present invention, if the setting priority order of the first processor 110 is higher than that of the second processor 120, the first processor 110 access the specific region 136 later without giving up to access the specific region 136 when the first processor 110 finds the second parameter 134 is "1", and the first parameter 132 can be maintained to be "1" (locked). The first processor will continuously detect the second parameter 134, and when the second parameter is set by the second processor 120 to be "0", the first processor 110 will immediately access the specific region 136. The specific flow chart is shown in FIG. 3.

Figure 3:
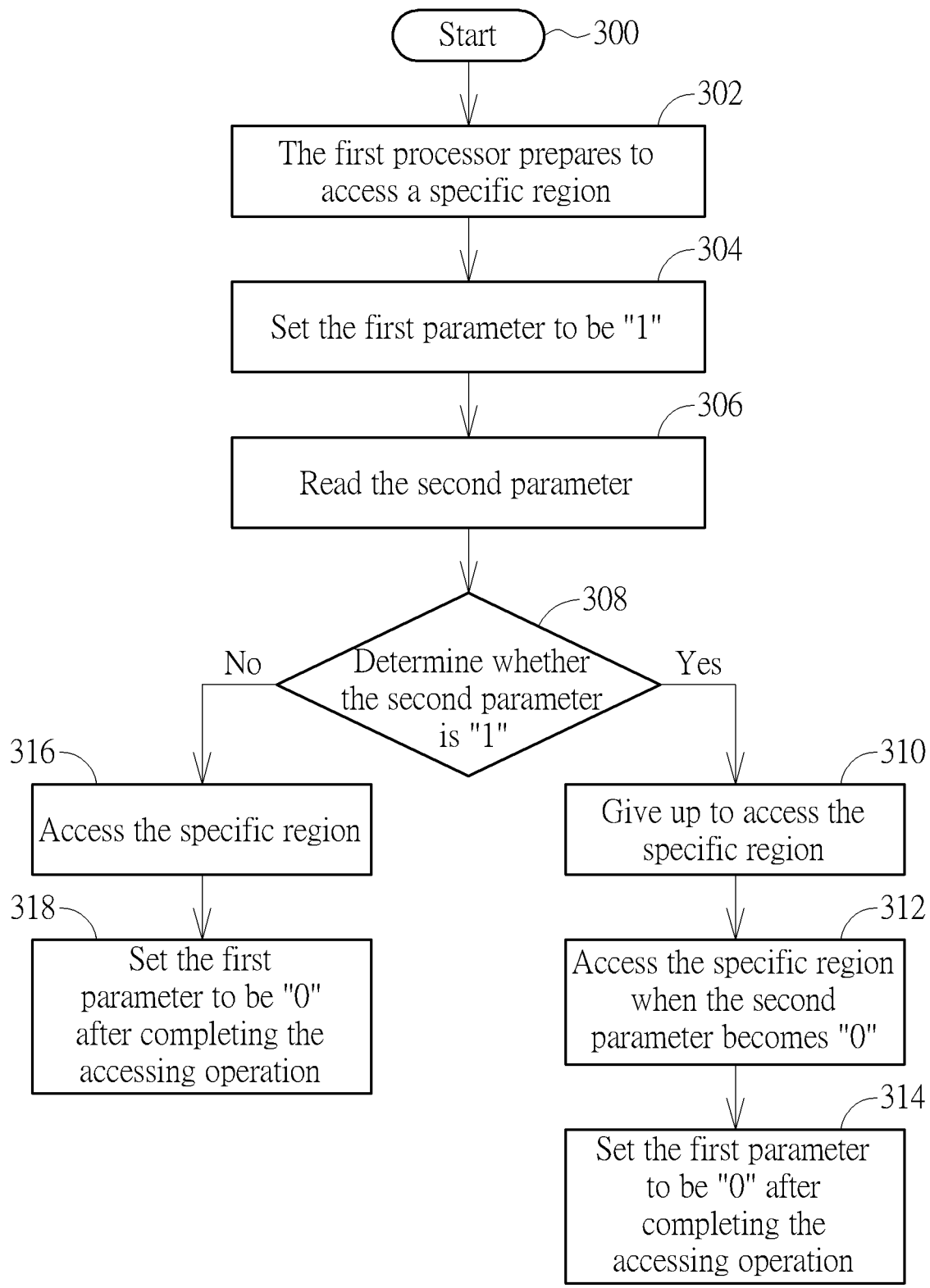
FIG. 3 is a flow chart of the first processor accessing the specific region according to another embodiment of the present invention.
Figure 4:
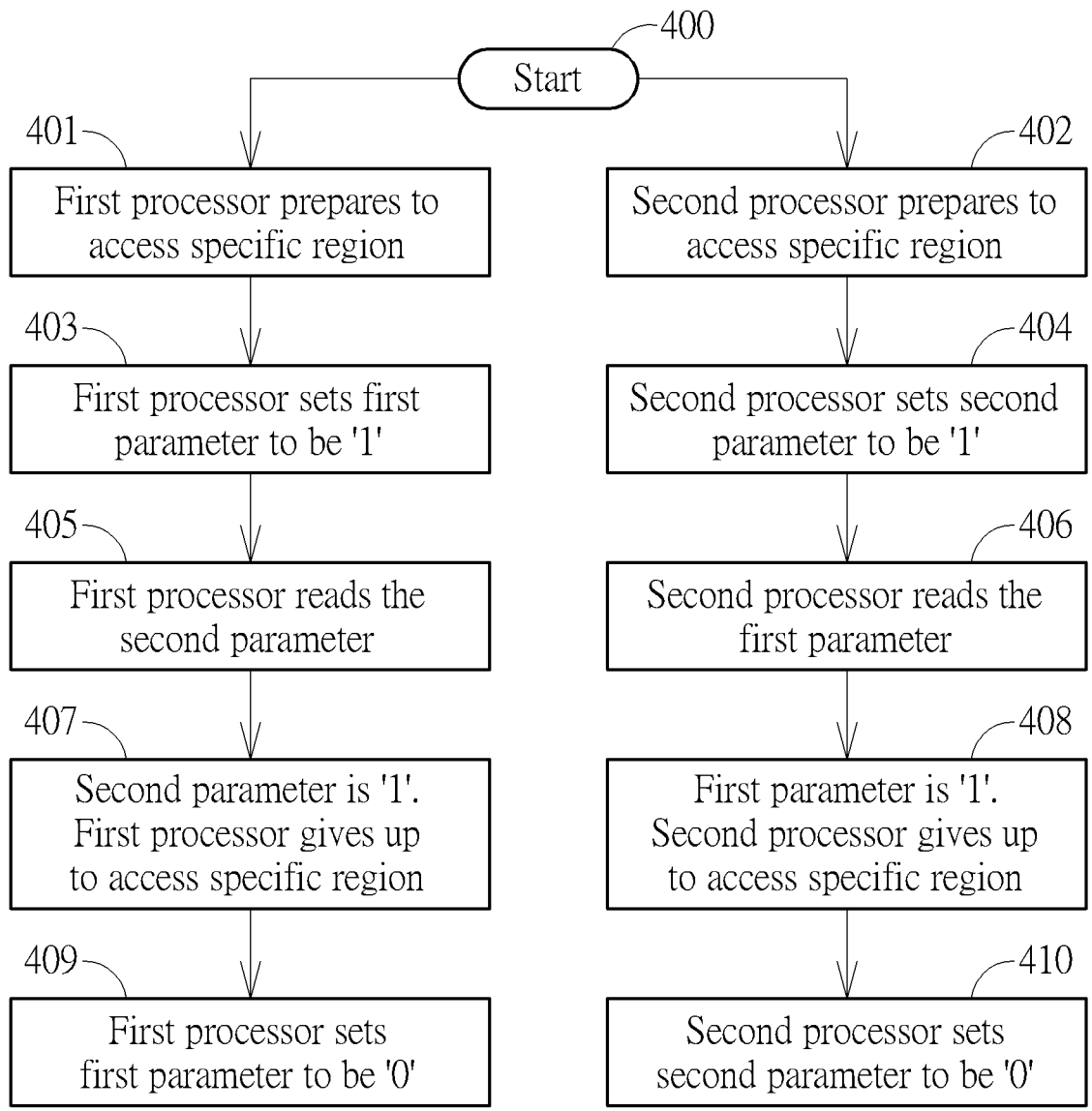
FIG. 4 illustrates a flowchart of the above embodiment. The flowchart comprises the following steps. The steps in the left hand side of the flowchart occur at the same time as the steps in the right hand side of the flowchart, such that the first processor and the second processor perform the same steps at the same time.

FIG. 3 is a flow chart of the first processor 110 accessing the specific region 136 according to another embodiment of the present invention. In the step 300, the flow starts. In the step 302, the first processor 110 might need to transmit data to the second processor 120 to write the data into the specific region 136, or receive the trigger of the second processor 120 to read the data from the specific region 136. In the step 304, before accessing the specific region 136, the first processor 110 sets the first parameter 132 to be "1" to indicate that the specific region 136 is locked. Next, in the step 306, the first processor 110 reads the second parameter 134. In the step 308, the first processor 110 determines whether the second parameter 134 is "1", that is, determines whether the second parameter 134 records that the specific region 136 is locked. If yes, the flow proceeds to the step 310, otherwise the flow proceeds to the step 316. In the step 310, although the second parameter 134 indicates that the specific region 136 is locked, that is, the second processor 110 prepares to access or is accessing the specific region 136, since the first processor 110 has a higher priority order, the first processor 110 does not directly give up to access the specific region 136 at this time, but continuously detects the second parameter 134. In the step 312, after the second parameter 134 is set from "1" to be "0", the first processor 110 can immediately access the specific region 136. In the step 314, the first processor 110 completes the accessing operation, and the first processor 110 sets the first parameter 132 from "1" to be "0". In the step 316, since the second parameter 134 indicates that the specific region 136 is unlocked, that is, the second processor 120 does not prepare to access or is not accessing the specific region 136, the first processor 110 can immediately access the specific region 136. In the step 318, after the first processor 110 completes the accessing operation, the first processor 110 sets the first parameter 132 to be "0".

In the embodiment shown in FIG. 3, since the first processor 110 has a high priority order, even if the second parameter 134 is found to be "1" when preparing to access the specific region 136, it is not necessary to set the first parameter 132 to be "0" to ensure that when the second parameter 134 becomes "0" (that is, when the second processor 120 completes the accessing operation or gives up the accessing operation), the first processor 110 can immediately access the specific region 136. It should be noted that the first processor 110 and the second processor 120 cannot simultaneously have the mechanism shown in FIG. 3 (that is, the two processors 110 and 120 cannot have the high priority order at the same time). In the embodiment of FIG. 3, if the second processor 120 finds that the first parameter 132 is "1" when preparing to access the specific region 136, the second processor 120 needs to immediately give up to access the specific region 136 and reset the second parameter 134 to be "0" to avoid errors.

In the above embodiment, the SoC 100 only comprises two processors, but this is not a limitation of the present invention. In other embodiments, the SoC 100 can comprise more than two processors, and the memory 130 comprises multiple parameters respectively corresponding to the multiple processors. Each processor will first set the parameter corresponding to itself to be "1" in preparation for accessing the specific region 136, and then refer to the parameters corresponding to other processors to determine whether the specific region 136 can be accessed. If any other parameter is "1", then give up to access. Since those skilled in the art can understand the situation of applying to more than two processors after reading the above embodiments, the details will not be described again.

Briefly summarized, in the SoC of the present invention, the first parameter and the second parameter are set in the memory to respectively indicate whether the first processor and the second processor prepare to access or are accessing the specific region. The first parameter and the second parameter are respectively utilized by the second processor and the first processor as references to determine whether a specific region can be accessed, which can effectively prevent two processors from accessing the memory at the same time, so as to solve the problem of read or write errors caused by simultaneously accessing the memory in the prior art.

Those skilled in the art will readily observe that numerous modifications and alterations of the device and method can be made while retaining the teachings of the invention. Accordingly, the above disclosure should be construed as limited only by the metes and bounds of the appended claims.

What is claimed is:

1. A system on chip (SoC), comprising:
a first processor;
a second processor; and
a memory, wherein the memory stores a first parameter and a second parameter, wherein the first parameter is a logical bit which can only be set by the first processor to indicate the first processor wishes to access a specific region of the memory, and the second parameter is a logical bit which can only be set by the second processor to indicate the second processor wishes to access the specific region of the memory;
wherein when the first processor intends or prepares to access the specific region, the first processor sets the first parameter to a logical value and then refers to the second parameter to determine whether the specific region is allowed to be accessed by the first processor; and when the second processor intends or prepares to access the specific region, the second processor sets the second parameter to a logical value and then refers to the first parameter to determine whether this specific region can be accessed by the second processor;
wherein when the first processor and the second processor simultaneously prepare to access the specific region, the first processor first sets the first parameter to indicate that the specific region is locked, and the second processor first sets the second parameter to indicate that the specific region is locked, and then the first processor and the second processor respectively refer to the second parameter and the first parameter to determine to give up accessing the specific region.

2. The SoC of claim 1, wherein when the second parameter indicates that the specific region is locked, the first processor gives up to access the specific region and resets the first parameter to indicate that the specific region is unlocked; and when the second parameter indicates that the specific region is unlocked, the first processor starts to access the specific region.

3. The SoC of claim 2, wherein after the first processor completes accessing the specific region, the first processor resets the first parameter to indicate that the specific region is unlocked.

4. The SoC of claim 1, wherein after the first processor and the second processor determine to give up to access the specific region, the first processor and the second processor resets the first parameter and the second parameter respectively to indicate that the specific region is unlocked.

5. The SoC of claim 1, wherein when the first processor prepares to access the specific region, the first processor first sets the first parameter to indicate the specific region is locked, and then refers to the second parameter to determine whether the specific region can be accessed immediately or the specific region can be accessed later.

6. The SoC of claim 5, wherein when the second parameter indicates that the specific region is unlocked, the first processor immediately starts to access the specific region; and when the second parameter indicates that the specific region is locked, the first processor continuously detects the second parameter until the second parameter is set by the second processor to indicate that the specific region is unlocked and then the first processor accesses the specific region.

7. The SoC of claim 6, wherein during the first processor continuously detecting the second parameter, the first parameter constantly indicates that the specific region is locked.

8. The SoC of claim 6, wherein after the first processor completes accessing the specific region, the first processor resets the first parameter to indicate that the specific region is unlocked.

9. The SoC of claim 1, wherein when the first parameter indicates that the specific region is locked, the second processor gives up to access the specific region and resets the second parameter to indicate that the specific region is unlocked; and when the first parameter indicates that the specific region is unlocked, the second processor starts to access the specific region.

10. The SoC of claim 9, wherein after the second processor completes accessing the specific region, the second processor resets the second parameter to indicate that the specific region is unlocked.

11. A method for accessing a memory within a SoC, wherein the memory stores a first parameter and a second parameter, the first parameter is a logical bit which can only be set by a first processor to indicate the first processor wishes to access a specific region of the memory, and the second parameter is a logical bit which can only be set by a second processor to indicate the second processor wishes to access the specific region of the memory, and the method comprises:

when the first processor intends or prepares to access the specific region, setting the first parameter to a logical value and then referring to the second parameter to determine whether the specific region can be accessed;

when the second processor intends or prepares to access the specific region, setting the second parameter to a logical value and then referring to the first parameter to determine whether the specific region can be accessed;

when the first processor and the second processor simultaneously prepare to access the specific region, using the first processor to first set the first parameter to indicate that the specific region is locked, and using the second processor to first set the second parameter to indicate that the specific region is locked; and the first processor and the second processor respectively refer to the second parameter and the first parameter to determine to give up to access the specific region.

12. The method of claim 11, wherein the step of referring to the second parameter to determine whether the specific region can be accessed comprises:

when the second parameter indicates that the specific region is locked, the first processor gives up to access the specific region and resets the first parameter to indicate that the specific region is unlocked; and when the second parameter indicates that the specific region is unlocked, using the first processor to start to access the specific region.

13. The method of claim 11, further comprising:

when the first processor prepares to access the specific region, using the first processor to first set the first parameter to indicate the specific region is locked, and then refers the second parameter to determine whether the specific region can be accessed immediately or the specific region can be accessed later.

* * * * *